Aug. 23, 1938.  W. P. DALRYMPLE  2,127,718
FREEWHEELING MECHANISM
Filed May 4, 1931  3 Sheets-Sheet 2
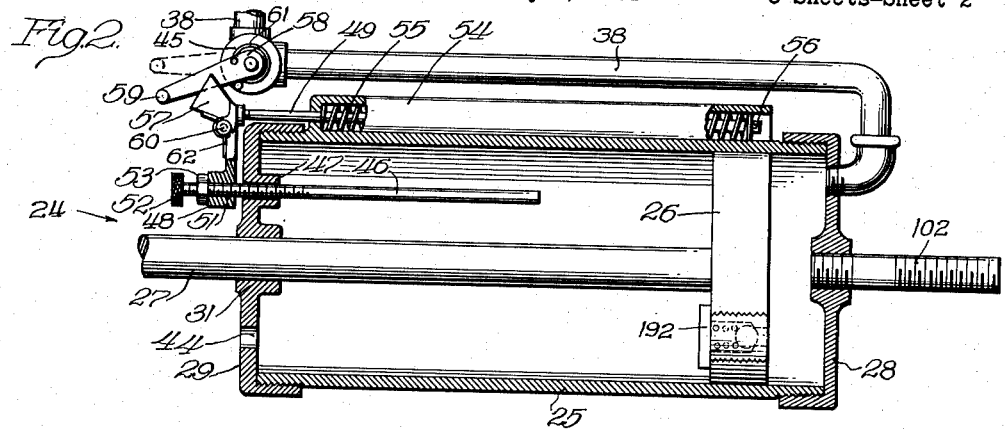
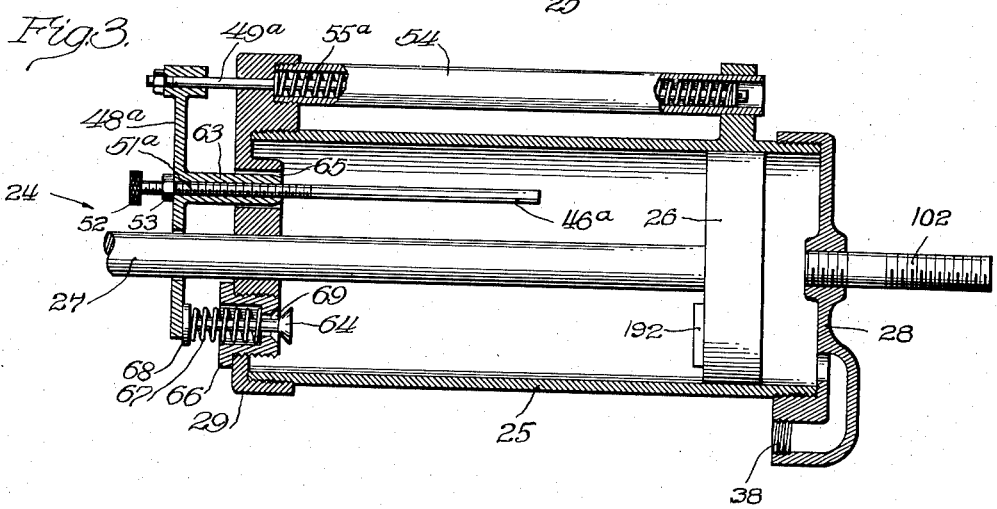
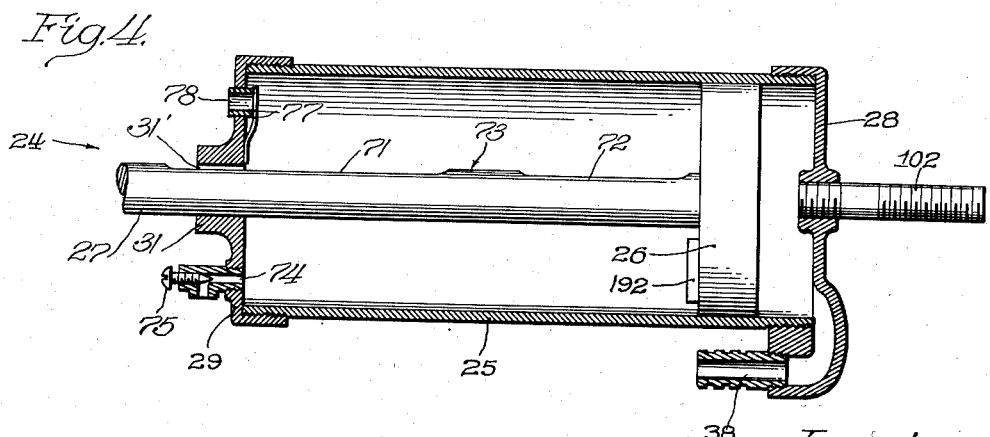
Inventor:
William P. Dalrymple
By Cameron A. Whitsett
Atty.

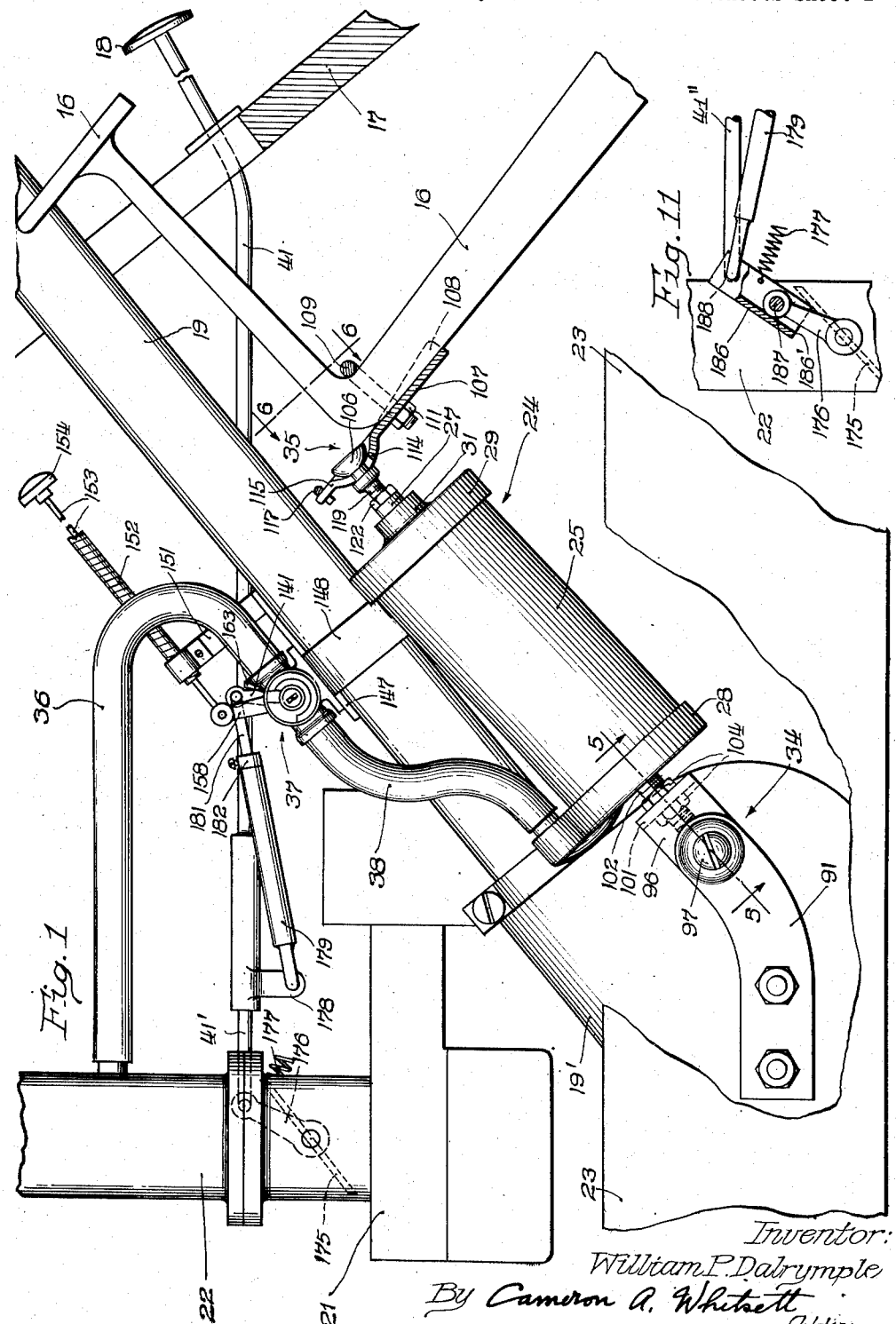

Aug. 23, 1938.  W. P. DALRYMPLE  2,127,718
FREEWHEELING MECHANISM
Filed May 4, 1931  3 Sheets—Sheet 3
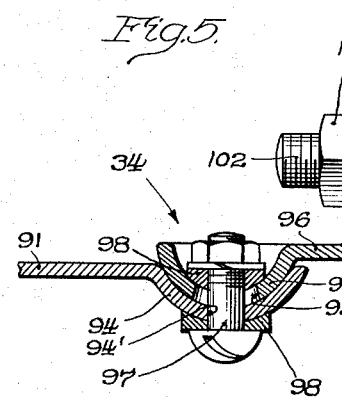
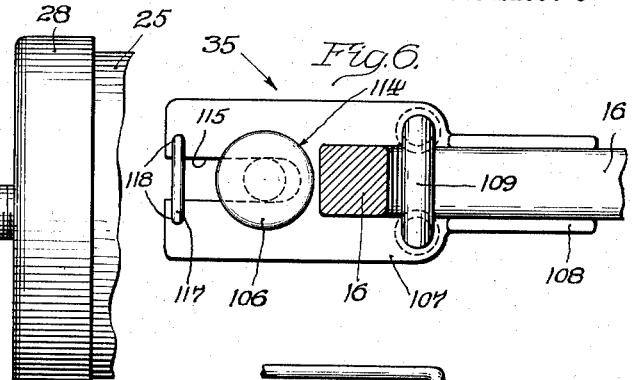
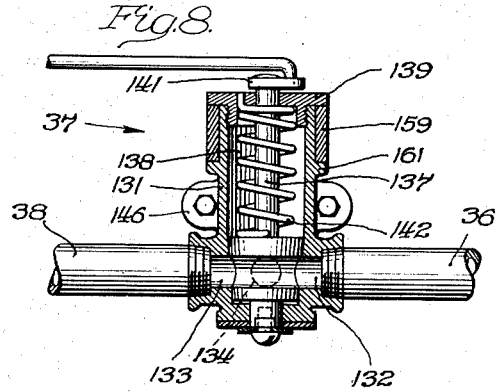
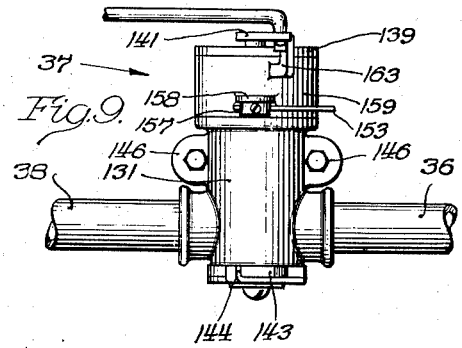
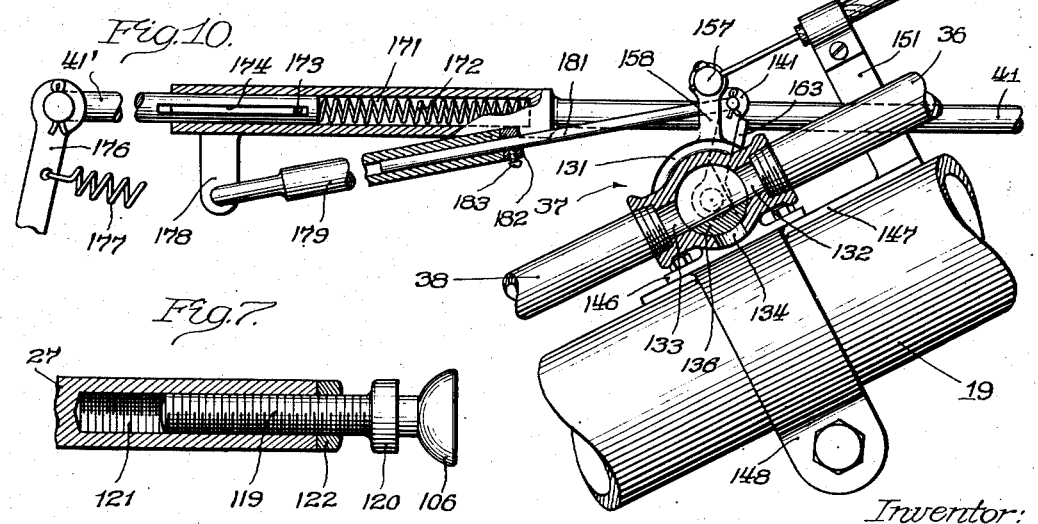
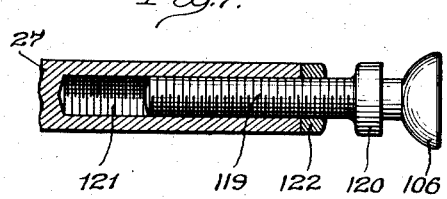
Inventor:
William P. Dalrymple
By Cameron A. Whitsett
Att'y Patented Aug. 23, 1938

2,127,718

UNITED STATES PATENT OFFICE 2,127,718

FREEWHEELING MECHANISM

William P. Dalrymple, Chicago, Ill., assignor to Bendix Products Corporation, South Bend, Ind., a corporation of Indiana Application May 4, 1931, Serial No. 534,761

2 Claims. (Cl. 192—.01)

The present invention relates to free wheeling mechanism for automobiles, and is of the type which effects free wheeling through automatic disengagement of the conventional automobile clutch. In its preferred embodiment, the present mechanism utilizes suction derived from the intake manifold to disengage the clutch, through an arrangement whereby the automatic disengagement of the clutch is responsive to the position of the accelerator. Hence, this mechanism possesses the further advantage of automatically actuating the clutch to aid in gear shifting, aside from its free wheeling function. The present mechanism can also be rendered operative or inoperative through the performance of an easily effected control, whereby the car can be made to free wheel or not, as desired.

My free wheeling mechanism can be constructed as a built-in part of the standard equipment of the car, or it can be constructed as an accessory for attachment to any make or model of car. Certain objects of the invention have to do with installation conditions and problems arising in the accessory field of use, where, in different makes and models of cars there may be wide variations in the length of the clutch stroke, in the time of engagement of the clutch in this stroke, in the amount of space available for installation, etc.

One of the general objects of the invention is to provide an improved construction of free wheeling attachment which will enable installation to be made on practically all makes and models of cars with a standard form of unit or with a minimum number of parts to be interchanged for different installation conditions. This is of great importance in the manufacturing and merchandizing of such an accessory because of the extremely large number of makes and yearly models of cars having different installation conditions, particularly in the used car field.

Another object of the invention is to provide improved means for controlling the engagement of the clutch. In disengaging the clutch, the suction from the intake manifold is transmitted to a cylinder, where it acts on a piston which transmits power to the clutch pedal for disengaging the clutch. In engaging the clutch, the piston is allowed to move back through its return stroke, and it is this return stroke which should be accurately controlled. The actual contacting of the clutch elements should preferably be a smooth, graduated motion so that the clutch will not grab, but at the same time the preliminary or lost motion part of the clutch pedal stroke just up to the point of clutch engagement should be relatively rapid so that there will be no objectionable delay in the clutch engagement. In the preferred embodiment of my invention I provide automatically operating control means whereby the early part of the return movement of the suction operated piston is relatively rapid just up to the point of clutch engagement, thereupon the return movement is slowed down so that the clutch is engaged smoothly and easily, and thereafter further return movement of the piston is again relatively rapid so that the final movement of the clutch pedal or of the driven clutch element is completed without delay. In the preferred embodiment of my invention, this automatic controlling means has, in its most desired form, direct mechanical coaction with the piston or the piston actuated parts so that the movement of this controlling means can be accurately timed relative to the clutch movement. This avoids any irregularities of operation which might result in grabbing of the clutch or an objectionably slow clutch operation; it also enables adjustment to be readily made to take up clutch wear; and it also enables a standard form of free wheeling unit to be quickly and easily adapted to different clutch strokes and different clutch adjustments encountered in various makes of cars, and cars having different conditions of service.

Another object of the invention is to provide improved mechanism for mounting the cylinder and piston unit in the car and for connecting it to the clutch pedal or other clutch actuating parts. In one preferred form of my invention wherein the piston rod is mechanically connected directly to the clutch pedal, these improved mounting devices and operating connections provide for universal pivotal movement of the cylinder and piston rod whereby a standard form of unit can be readily adapted to different installation conditions on different cars, and whereby variations of alignment are compensated for in the unit.

Another object of the invention is to provide improved valve means which transmits suction to the cylinder for causing operation of the clutch in one direction, and which vents atmosphere to the cylinder for causing operation of the clutch in the other direction; also to provide an improved construction and arrangement of the operating connections between this valve means and the accelerator. In this regard, another object of the invention is to provide improved means for rendering the free wheeling mechanism non-operative, which is sometimes desirable when driving in rainy weather or other slippery conditions.

Other objects and advantages of the invention will appear from the following detail description of a preferred embodiment thereof illustrated in the accompanying drawings. In this embodiment I have shown numerous improved features, some of which are of particular utility when the device is intended for installation as an accessory, and others of which have equal utility when the device is a built-in part of the standard car equipment. It will therefore be understood that my invention has advantageous utility in either field of use. In the accompanying drawings:

Figure 1 is a fragmentary side elevational view showing one typical installation of my invention on a car;

Figure 2 is a longitudinal sectional view of the power unit consisting of the cylinder and piston, and showing one form of timing mechanism for automatically controlling the clutch engagement;

Figure 3 is a similar sectional view showing another form of automatic timing mechanism;

Figure 4 is a sectional view illustrating still another arrangement of timing mechanism;

Figure 5 is a detail sectional view taken approximately on the plane of the line 5—5 of Figure 1, illustrating the lower mounting connections for the cylinder;

Figure 6 is a detail sectional view taken approximately on the plane of the line 6—6 of Figure 1, illustrating the attachment connections for the upper end of the piston rod;

Figure 7 is a detail sectional view showing the manner of adjusting the upper end of the piston rod;

Figure 8 is a sectional view through the suction control valve, taken approximately on the plane of the line 8—8 of Figure 10;

Figure 9 is a plan view of the valve;

Figure 10 is a diagrammatic view illustrating the operating connections between the accelerator and suction control valve; and Figure 11 is a detail view of a modified operating connection between the accelerator, the throttle and the suction control valve.

Referring to Figure 1, the clutch pedal is indicated at 16, the floor board at 17, the accelerator pedal at 18, the steering column at 19, the carburetor at 21 and the intake manifold at 22. The side channel 23 of the chassis frame is shown as being broken away to illustrate the mounting of the power unit, which is designated 24 in its entirety. This power unit comprises a cylinder 25 having a piston 26 reciprocating therein and provided with a piston rod 27 extending up through the head end of the cylinder and connecting with the clutch pedal 16. The cylinder comprises a lower head 28 and an upper head 29, the latter being provided with a guide boss 31 through which the piston rod 27 passes. If desired, the piston 26 may be provided with one or more cup washers or piston rings to prevent leakage of air past the piston. The lower end of the cylinder has connection with a stationary point on the car through an improved mounting bracket generally indicated at 34, and the upper end of the piston rod 27 has direct connection with the clutch pedal 16 through an improved form of attachment bracket generally indicated at 35, both of which devices 34 and 35 I shall hereinafter describe in detail.

Suction is transmitted from the intake manifold 22 through any suitable conduit 36, such as a flexible rubber or metallic hose, to a suction control valve generally indicated at 37. From this valve the suction is transmitted through a conduit 38 to the lower end of the cylinder 25.

An operating connection between the accelerator pedal 18 and the carburetor throttle valve is indicated by the rod 41. An improved arrangement of actuating mechanism is connected between the accelerator or its actuated parts and the control valve 37, whereby when the pedal is allowed to return to or towards its retracted idling position the valve 37 is actuated to transmit suction to the lower end of the cylinder 25 in order to disengage the clutch, and whereby when the accelerator pedal is depressed the initial part of such movement first actuates the valve 37 to cut off the transmission of suction and vent atmosphere to the lower end of the cylinder in order that the clutch shall be caused to engage, and thereafter the accelerator movement opens the throttle to increase the engine speed. This will be explained in more detail later in connection with the description of the suction control valve and its operating connections.

As previously described, when atmosphere is vented to the lower end of the power cylinder for causing engagement of the clutch, the first part of the return movement of the piston 26 should be relatively rapid, then this movement should be slowed down just when the clutch engages so that this engagement shall be smooth and easy, and thereafter the piston may move with a rapid motion until the clutch pedal 16 completes its movement in the upward or clutch engaging direction. Referring now to Figure 2, illustrating one form of automatic timing mechanism for securing this operation, in this embodiment the upper end of the cylinder has a constantly open communication with the atmosphere through a port 44 provided in the upper cylinder head 29. In this form, the variable speed of the piston is regulated by controlling the venting of atmosphere into the lower end of the cylinder. The conduit 38 leading from the main control valve 37 to the cylinder has a timing valve 45 interposed therein and arranged to be controlled directly by movement of the piston 26. A rod 46 enters the head end 29 of the cylinder through a guide boss 47 and is adapted to have its inner end engaged by the upper side of the piston 26 when the piston reaches the point corresponding substantially to initial contacting of the clutch elements. Outside the cylinder, the rod 46 is mounted in a bracket 48 to which is connected a spring plunger 49 normally tending to move the bracket and rod 46 in an inward direction. Said rod has threaded mounting in a boss carried by the bracket 48, as indicated at 51, and is provided with any suitable form of adjusting head 52 by which the rod can be screwed inwardly or outwardly in the bracket so as to adjust the point at which the rod is engaged by the piston in its return stroke. A lock nut or any other suitable securing device 53 may be provided for maintaining the adjustment of the rod 46. The spring rod 49 extends into a spring housing 54 which may be constructed as an integral part of the cylinder 25, or as a separate tube secured thereto. A compression spring 55 is confined between the upper end of this housing 54 and a pin or shoulder 56 on the other end of the rod.

The bracket 48 carries a cam 57 which is adapted to impart oscillatory motion to a swinging arm 58 which operates the valve 45. When said valve arm 58 occupies the position illustrated in full lines the valve affords free and unrestricted communication for venting atmosphere through the conduit 38 to the lower end of the cylinder. However, as soon as the upper side of the piston 26 engages the inner end of the rod 46 and starts thrusting the cam 57 outwardly, this cam pressing upwardly on the crank pin 59 on the valve arm 58 swings that arm up to the dotted line position shown, which places the valve element in a restricted position for throttling the flow of atmosphere to the lower end of the cylinder. At this instant the clutch elements are allowed to engage gradually, since the return movement of the piston 26 is slowed down. After the peak of the cam 57 has passed the crank pin 59 the valve arm 58 is swung back to its original position, as by any suitable spring means 61, whereupon unrestricted flow of atmosphere occurs through the valve to the lower end of the cylinder, thereby allowing the clutch pedal 16 to move to the upper limit of its travel with a rapid motion. In the reverse, suction actuated movement of the piston the cam 57 trips downwardly and does not swing the arm 58 upwardly. This may be accomplished by pivoting the cam at 60 and providing a light spring 62 which normally holds the cam pressed back against a suitable stop on the bracket 48, but which spring allows the cam to swing downwardly on its backward movement past the crank pin 59. In adapting this embodiment of my invention to different makes or models of cars wherein actual clutch engagement occurs at different points in the clutch pedal movement, or to correct for wear of the clutch surfaces, it is only necessary to screw the rod 46 inwardly or outwardly in the bracket 48 in order to adjust the timed relation of the piston 26 to the particular installation conditions.

In Figure 3 I have illustrated another embodiment wherein the variable speed return movement of the piston 26 is controlled by regulating the venting of air from the upper end of the cylinder as the piston moves up in its return stroke. In this form, a rod 46a also extends into the upper end of the cylinder and has its outer portion threaded at 51a for adjustable mounting in a bracket 48a. The latter has connection with a spring rod 49a extending into a spring housing 54a and having a coiled spring 55a therein coacting with the rod to normally pull the bracket 48a and rod 46a inwardly, in the same manner as described of the above embodiment. The movement of the member 48a controls a valve 63 carried by said member, and also controls a spring pressed check valve 64 carried by the cylinder head 29. When the valve 63 is at the inner limit of its movement it restricts or approximately closes a port 65 formed in the cylinder head 29. Preferably the rod 46a has its threaded adjustable mounting in this valve extension 63, although the rod might be arranged to pass through a separate boss on the bracket member 48a. The check valve 64 is supported in a suitable valve cage 66 screwing into the cylinder head 29, the stem of the valve being encircled by a coil spring 67 confined between the cage 66 and a head 68 on the outer end of the valve stem. When the bracket member 48a is at the inner limit of its motion it bears against the head 68 and holds the check valve 64 in open position. In the initial outward movement of the piston 26 the air confined in the upper end of the cylinder has rapid egress therefrom through the wide open port 69 of the check valve 64 so that the piston can move rapidly during this part of its stroke. Just before the clutch elements engage, the piston strikes the rod 46a and moves the bracket member 48a outwardly with it. In the first part of such movement the check valve 64 is seated so that thereafter the air confined in the upper end of the cylinder is compelled to pass out through the port 65 which is then restricted by the valve 63. The restricted discharge of the air slows the motion of the piston down at this point, resulting in a gradual engagement of the clutch. By the time that this engagement is completed the valve 63 has moved out of the port 65 and thereafter the piston can continue its outward travel with a rapid motion because of the unrestricted discharge of air through the port 65. When the piston is drawn forward by suction in the act of disengaging the clutch, air is free to flow into the upper end of the cylinder through the port 65, and when the valve 63 starts to move into this port and restrict it the spring pressed check valve 64 is free to open so as to continue the unrestricted admission of air to this end of the cylinder, whereby the piston has a rapid clutch disengaging movement. This embodiment can also be easily and quickly adjusted to correspond to different points of engagement of the clutch relative to the stroke of the clutch pedal by merely screwing the rod 46a inwardly or outwardly, as pointed out in the previously described embodiment.

Figure 4 illustrates another embodiment of automatic timing means. In this embodiment the piston rod 27 has two grooves or flat spots 71 and 72 formed therein and extending longitudinally of the piston rod. Intermediate these two recessed portions the rod has a cylindrical section 73. When the piston is drawn downwardly to clutch releasing position, as illustrated in Figure 4, the outer recess 71 extends through the bore 31' and thereby affords a venting opening out along this recessed portion. Hence, in the return movement of the piston the stroke is quite rapid until the cylindrical section 73 moves into the bore 31' and closes or substantially closes the latter against the discharge of air from the upper end of the cylinder. While the cylindrical section 73 is moving through the bore 31' the motion of the piston is retarded, corresponding to the time of engagement of the clutch; and, thereafter, when the second recessed portion 72 moves into and communicates with both ends of the bore 31' the motion of the piston is again rapid up to the end of its stroke. A bleeding passageway 74 leads from the upper end of the cylinder and is regulated by an adjustable metering screw 75 whereby the rapidity of motion of the cylindrical section 73 through the bore 31' can be adjusted to different clutch conditions. An inwardly opening check valve 77 controls an inlet port 78 in the end head 29, which check valve permits a rapid admission of air to the upper end of the cylinder when the piston is moving downwardly in its clutch releasing stroke.

In each of the embodiments illustrated in Figures 2, 3 and 4 the area at the right hand end of the cylinder between the piston 26 and the cylinder end head 28 constitutes an expansible and contractible suction-responsive chamber. In each of the embodiments of Figures 3 and 4 the area at the left hand end of the cylinder between the piston 26 and the cylinder end head 29 constitutes what may be regarded as an expansible and contractible checking chamber. In all three embodiments, the rapidity of the return motion of the piston 26 in its clutch engaging direction of travel is subjected to a varying control by a varying regulation of the pressure differential on opposite sides of the piston 26, i. e., in Figure 2 it is the varying rate of admission of air to the suction responsive chamber that controls or establishes the pressure differential on opposite sides of the piston; and in Figures 3 and 4 it is the varying rate of egress of air from the checking chamber that controls or establishes the pressure differential on opposite sides of the piston.

Referring now to the construction of the lower mounting fixture 34, it will be seen from Figures 1 and 5 that this device comprises a stationary bracket 91 which is suitably secured to any preferred part of the automobile structure, preferably at a point adjacent to and forward of the clutch pedal 16. For example, this bracket might be secured to standard bolts entering the housing 19' which encloses the steering gear sector at the lower end of the steering column; or this bracket might be extended outwardly and suitably secured to the side frame channel 23. The upwardly inclined end of this bracket is formed with a spherically shaped bearing portion 94 having a hole 94' passing centrally therethrough. A cooperating movable bracket 96 has a corresponding spherically shaped bearing portion 95 formed therein and having a hole 95' passing centrally therethrough. The two bearing portions 94 and 95 are nested, one within the other, and a suitable bolt 97 is passed through the holes 94' and 95'. Spherically shaped washers 98 on said bolt engage the inner and outer spherical bearing portions. The shank of the bolt 97 is slightly smaller than the holes 94' and 95', or these holes are slightly elongated along the line of the axis of cylinder 25, so that the movable bracket 96 can swivel sidewise or in a direction transverse of the car. The effect is that of a ball and socket universal joint which permits the upper end of the piston rod 27 to be moved either sidewise or up or down in effecting attachment to the clutch pedal 16. This universal joint 94, 95 also provides a pivotal axis at the lower end of the cylinder around which the cylinder and piston rod swing through a limited arc in the inward and outward movement of the clutch pedal 16.

The lower head 28 of the cylinder may be secured to the movable bracket 96 in any suitable manner, although I preferably make the cylinder longitudinally adjustable relative to the bracket 96 so that the cylinder can be shifted endwise towards or away from the bracket. This may be accomplished by forming a right angle leg 101 in said bracket and having a hole in this leg slide freely over the threaded portion of a stud bolt 102 which is anchored in the cylinder head 28. Two lock nuts 104 screw over this stud bolt and engage the upper and lower sides of the bracket leg 101. By appropriately screwing these nuts upwardly or downwardly along the stud the cylinder 25 can be shifted longitudinally relatively to the pivot axis 97.

Referring now to the construction of the fitting 35 which connects the upper end of the piston rod 27 to the clutch pedal 16, it will be seen from Figures 1 and 6 that the upper end of said piston rod carries a spherically shaped head 106. Secured to the clutch pedal is a bracket 107 comprising a channel shaped lower portion 108 which embraces the bottom and sides of the rearwardly inclined portion of the pedal lever. A U-bolt 109 engages across the upper side of said lever portion and has its threaded ends passing down through holes in the sides of the bracket 107, on opposite sides of the pedal lever, and receiving nuts 111 on their lower ends for rigidly clamping the bracket 107 to the lever. The upwardly extending portion of said bracket is formed with a spherical socket portion 114 adapted to receive the spherically shaped head 106 on the end of the piston rod. A slot 115 extends from the outer extremity of the bracket into the center of the spherical seat 114. A retaining link or key 117 passes through holes 118 in the outer portions of the bracket and extends across said slot for preventing the spherical head 106 from accidentally becoming disengaged from the socket 114. The resulting construction affords a universal ball and socket joint between the piston rod and the clutch pedal which provides for pivotal movement between these parts in the motion of the clutch pedal and which also accommodates any variations in sidewise alignment between the cylinder and pedal. That is to say, by virtue of the ball and socket joints at the base end of the cylinder and at the upper end of the piston rod the axis of the cylinder can lie at an angle transversely with respect to the vertical plane of the pedal movement. Such enables the lower stationary bracket 91 to be secured to different points on the car structure, either inwardly or outwardly of the longitudinal vertical plane of the clutch pedal 16, without resulting in any binding of the parts.

The effective length of the piston rod 27 is preferably made adjustable, as shown in Figure 7. This may be accomplished by providing the spherical head 106 on the end of a threaded shank 119 which screws into a threaded bore 121 in the end of the piston rod. A lock nut 122 serves to secure the threaded shank 119 in any lengthwise adjustment. The screw threaded adjustment 102, 104 at the lower end of the cylinder and the screw threaded adjustment 119, 121 at the upper end of the piston rod enable the overall length of the power unit 24 to be easily and quickly adjusted to any installation conditions. That is to say, the overall length of the power unit may be increased or decreased for adapting the device to different makes and models of cars where the distance between the clutch pedal and a convenient point of attachment for the stationary bracket 91 may vary considerably. Either the threaded adjustment at the lower mounting bracket 34, or the threaded adjustment in the piston rod at the upper attachment bracket 35, or both, may also be utilized to vary the timing of the piston movement relative to the time of clutch engagement. For example, by shifting the cylinder longitudinally, or by changing the effective length of the piston rod, or by making both of these adjustments, the point at which the piston is caused to decelerate in its upward stroke can be correspondingly related to the point in the movement of the clutch pedal where the clutch elements are just beginning to engage.

Referring now to the construction and arrangement of the suction control valve 37, and with particular reference to Figures 8, 9 and 10, it will be seen that the valve comprises a valve housing 131 having a valve port 132 which connects with the conduit 36 leading to the intake manifold, a valve port 133 which connects with the conduit 38 leading to the cylinder, and an atmospheric port 134. The valve body 136 has a passageway therein adapted in one position to block off the port 132 and to place the ports 133 and 134 in communication for admitting atmosphere to the cylinder, and in another position to block off the atmospheric port 134 and to place the ports 132 and 133 in communication for transmitting suction from the intake manifold to the power cylinder. The rotatable valve body 136 has a stem 137 extending back through an enlarged counterbore 138 in the valve housing. A cap 139 closes this end of the housing, and the valve stem extends through this cap for receiving an operating arm 141 on its outer end, through which the valve is oscillated. A coil spring 142 is disposed in the counterbore 138 and has one end anchored to the valve stem 137 and the other end anchored to the housing or cap so coiled that its tension normally tends to rotate the valve into the dotted line position illustrated in Figure 8, that is, into the position where the port 132 is blocked off and the port 133 is placed in communication with the atmospheric vent 134. The opposite end of the oscillatory valve body or stem carries a radially extending stop 143 which is adapted to engage shoulders 144 for limiting the movement of the valve.

This suction control valve may be mounted at any desired point on the engine, the frame or any other part conveniently located with respect to the intake manifold and the power cylinder. In the preferred arrangement, adaptable to most makes and models of cars, I mount said valve on the steering column 19. Base flanges or attaching brackets 146 on the valve housing are suitably secured to a mounting plate 147 which is fastened to the steering column. This is preferably accomplished by providing a clamp 148 for the mounting plate 147, the clamp enabling the assembly to be readily secured at any point along the length of the column and also accommodating steering columns of different diameters. A supporting arm 151 extends upwardly from one end of the mounting plate 147 for securing one end of a Bowden wire cable 152. This cable is provided for the purpose of actuating a device which makes the present free wheeling mechanism non-operative when desired. The cable comprises the usual flexible sheath having a flexible wire 153 extending therethrough, the upper end of the cable extending to a suitable fixture on the dash or steering column, where a plunger button 154 is provided to push or pull the wire 153. The lower end of this wire is secured to a disc or collar 157 which has swiveled mounting on the end of a siwnging arm 158. Said arm extends upwardly from one end of a sleeve 159 which embraces the valve housing 131 and is rotatable thereon. The sleeve is confined endwise between the end cap 139 and an annular shoulder 161 projecting from the valve housing. A second arm 163 projects from the sleeve 159 into the path of the valve operating arm 141. When the present mechanism is to have its normal free wheeling function the arms 158 and 163 are swung backwardly to the positions illustrated in Figure 10. At this time, the main controlling arm 141 is free to have a full range of movement for oscillating the valve 136 from the full line position to the dotted line position and back. When it is desired to make the free wheeling function non-operative the arms 158 and 163 are thrust forwardly, such causing the arm 163 to move into a position where it blocks rearward movement of the arm 141, thereby holding the valve in its dotted line position with atmosphere continuously vented to the power cylinder.

Referring now to the operating connection between the accelerator and the valve operating arm 141, it will be seen by reference to Figure 10 that the forward end of the accelerator rod 41 is provided with a bore 171 in which an extension portion 41' of the rod is adapted to slide. A compression spring 172 is confined between the inner end of the bore and the inner end of the extension rod 41'. To prevent accidental displacement of the extension rod 41' and spring 172 from the bore 171 a cross pin 173 is passed through the enlarged portion of the rod 41 and through a slot 174 in the extension rod 41'. The front end of the extension rod 41' has pivotal connection with the throttle arm 176 of the carburetor 21. This throttle valve has the conventional spring 177 normally tending to move the throttle valve to closed position, such spring being diagrammatically shown as connected to the throttle arm 176. Extending from the main portion 41 of the accelerator rod is an apertured lug 178 to which the front end of a sleeve 179 is pivoted. A rod 181 slides endwise in the sleeve 179, and has its rear end pivotally connected to the suction valve operating arm 141. A stop collar 182 is adjustably secured to the rod 181, as by the set screw 183, this collar being adapted to abut the end of the sleeve 179.

The spring 172 is proportioned to have less strength than the spring 177 but to have a greater strength than the spring 142 which oscillates the suction control valve. In the normal position of the parts, when no pressure is exerted on the accelerator pedal 18, the throttle spring 177 holds the throttle valve in idling position, with the extension rod 41' thrust rearwardly, and this in turn, acting through the spring 172, holds the main rod 41 and accelerator pedal 18 thrust rearwardly, and also holds the suction control valve arm 141 thrust rearwardly, thereby holding said valve in free wheeling position for transmitting suction from port 132 to port 133.

In the operation of the mechanism, when the accelerator pedal 18 is depressed to obtain a higher car speed either for ordinary traveling or for gear shifting, it is of course desirable that the clutch be engaged. This occurs automatically, and before the engine speed is accelerated, in the following manner. The initial part of the movement given the accelerator pedal is not transmitted to the throttle arm 176 because of the lost motion connection between the rod sections 41 and 41' and because the spring 177 is of greater strength than the spring 172. This initial movement is, however, transmitted to the sleeve 179, causing the latter to move forwardly and permitting the suction valve control arm 141 and rod 181 to move forwardly under the pressure of the spring 142 which is contained within the suction control valve. This initial movement is sufficient to allow the suction control valve to swing to the dotted line position illustrated in Figure 10, thereby blocking off the transmission of suction and admitting atmosphere to the power cylinder. The piston in such cylinder immediately moves upwardly and allows the clutch to engage. With continued depression of the accelerator pedal 18 motion is then transmitted to the extension rod 41', either by virtue of the pin 173 engaging the front end of the slot 174 or by the spring 172 becoming solid. The consequent forward motion of the extension rod 41' opens the throttle valve and accelerates the engine, this occurring after the clutch is engaged. This continued forward motion of the accelerator rod does not disturb the suction control valve because of the lost motion slip connection in the link 179—181. When the car has been brought up to the desired speed, and it is desired to free wheel, or to disengage the clutch for shifting gears, the operator lifts his foot from the accelerator pedal 18, whereupon the throttle spring 177 thrusts the rod sections 41' and 41 rearwardly, such also thrusting the sleeve 179 and rod 181 rearwardly. The consequent backward oscillation of the suction valve control arm 141 instantly swings the valve 136 into the full line position illustrated in Figure 10, thereby transmitting suction to the power cylinder and causing the piston therein to disengage the clutch. The clutch will remain disengaged for continued free wheeling of the car until the accelerator pedal 18 is again depressed for increasing the car speed, whereupon the clutch is again engaged in a repetition of the cycle above described.

When the free wheeling function is made non-operative by the forward swinging of the stop arm 163, such stop arm holds the control arm 141 in its forward position with suction blocked off and atmosphere admitted to the power cylinder. As long as the arm 163 remains in this forwardly oscillated position the mechanism cannot free wheel. The control arm 141 is permitted to remain in this forward position by virtue of the spring 172, the accelerator pedal 18 and rod 41 being depressed or thrust forwardly by the yielding of said spring through a distance corresponding substantially to the lost motion permitted between the rod sections 41 and 41'. That is to say, holding the arm 141 in its non-free-wheeling position holds the accelerator pedal 18 slightly depressed through that range of its movement corresponding to its initial or lost motion, but does not affect the setting of the throttle, which remains in its normal idling position until the accelerator pedal is depressed still further by the driver. In adapting the apparatus to different installation conditions the effective length of the thrusting link 179—181 may be increased or decreased by appropriately adjusting the stop collar 182 along the rod 181.

Figure 11 illustrates a modified form of operating connection between the accelerator, the throttle and the suction control valve. This construction is designed so that no special accelerator rod or accelerator fittings are necessary. The rod 41" illustrates any conventional accelerator connection extending to the throttle arm 176. This rod or connection 41" is disconnected from said throttle arm and a swinging fitting or bracket 186 is interposed therebetween. This device is preferably of channel shape, having a space between its side flanges of sufficient width to engage over the swinging end of the throttle arm 176. The lower portion of the member 186 is pivoted on the swinging end of the throttle arm by a pivot pin 187 passing through the two sides of the channel member and through the throttle arm. The accelerator rod 41" is pivotally connected at 188 to the upper end of the swinging attachment 186. Either the sleeve or rod portion of the extensible link 179, 181 is also pivoted to the upper portion of the member 186. A pivot pin may pass transversely through the upper portion of said member, at 188, and both members 41" and 179 may have pivotal mounting on this pin, or the pivotal connection can be established in any other desired manner. The throttle spring 177 is operatively connected with an intermediate point of the swinging bracket member 186. Normally, the spring 177 holds the parts retracted substantially in the positions shown, with the throttle valve 175 in its idling position. At this time the suction control valve 37 is at one limit of its movement, and because the connection 179 cannot move rearwardly any further the spring 177 is effective to hold the throttle valve 175 in this closed or idling position. When the accelerator rod 41" is thrust forwardly the action of the spring 177 is such that the bracket member 186 merely swivels forwardly around the pivot pin 187, and no rocking motion is transmitted to the throttle arm 176 during the initial forward movement of the rod 41". This initial forward movement is effective, however, to permit the suction control valve 37 to rotate to the position where atmosphere is vented to the pneumatically operated power unit 24. With continued forward movement of the rod 41", a suitable stop 186' on the bracket member 186 engages the forward side of the throttle lever 176, and thereafter the throttle opens with continued movement of the rod 41".

The above described construction illustrated in Figure 11 secures the same function and result described of the preceding embodiment. This modified arrangement also permits the device to be made non-operative for free wheeling in the same manner as previously described.

When the free wheeling mechanism is made non-operative by the lock-out mechanism 154, 153 etc. so that the clutch is only engaged and disengaged through direct manipulation of the clutch pedal by the operator, it is, of course, desirable that the piston 26 shall not offer any appreciable resistance to quick downward pressure on the clutch pedal. In one arrangement whereby the piston will not retard downward pressure exerted mechanically thereon, a cup leather is secured to the upper side of the piston for engagement with the cylinder wall, this cup leather forming an effective seal when suction is transmitted to the lower end of the cylinder, but permitting air trapped in the lower end of the cylinder to slip past the piston and cup leather when the piston is forced down mechanically. Another alternative arrangement is illustrated in Figures 2, 3 and 4 wherein an upwardly opening check valve 192 is embodied in the piston so that when the latter is forced down mechanically air confined below the piston can pass directly through said check valve 192.

When the mechanism is performing its automatic free wheeling function the operator rarely if ever has to use his left foot (in a left hand drive car) on the clutch pedal, possibly only when moving slowly through traffic in first gear, and accordingly I propose as another feature of my invention the provision of a left hand accelerator pedal 18 which the operator can manipulate with his left foot. This left accelerator pedal may supplant the conventional right pedal, although preferably I provide it as an adjunct which is operatively connected to the standard pedal. By providing this left pedal both feet may be used, the left foot on the accelerator pedal and the right foot on the brake pedal, such being of particular advantage for frequent speed changes in traffic and for starting the car after being stopped on a hill.

The free wheeling shut off or lock-out mechanism 154, 153, etc., may also be embodied in the form of a foot controlled pedal which can be locked in either position.

It will be seen from the foregoing that the only substitution which may be necessary in adapting the mechanism to practically all makes and models of cars is possibly the use of a different form of lower stationary bracket 91 and a different form of upper pedal lever bracket 107, and even these may easily be made universal for a considerable number of different makes and models of cars. By having the pneumatic power unit 24 pivotally mounted to swing as an extensible and contractible link or strut between the clutch pedal and a pivot on the frame there is avoided any complicated connections between the power unit and the clutch pedal, there is no possibility for slack or looseness to develop, and the entire power unit 24 can be mounted in a minimum amount of space, but where it still remains readily accessible for any adjustments.

It will be apparent that the broad features of my invention are capable of adaptation in other forms, and that numerous modifications and rearrangements may be made without departing from the essence of the invention.

I claim:

1. In automobile clutch control mechanism, the combination with a clutch control member, an intake manifold, a throttle valve cooperating therewith, a throttle arm for moving said valve, and an accelerator rod adapted to actuate said throttle arm, of a pneumatically operating power unit comprising a chamber and a cooperating movable member, means operatively connecting said power unit with said clutch control member, means for transmitting suction from said intake manifold to said power unit, a valve adapted to control the transmission of suction, a valve actuating device therefor, and a member pivotally mounted on said throttle arm to swing relatively thereto and operatively connected with said accelerator rod and with said valve actuating device whereby initial movement of said accelerator rod in one direction moves said member relatively to said throttle arm to move said valve actuating device, and thereafter transmits motion to said throttle arm for opening said throttle valve.

2. A clutch operating accessory for vehicles having a throttle control comprising a cylinder, a piston movable in the cylinder and means for connecting the piston to the clutch, a conduit connected to the cylinder and to a source of fluid pressure, valve means for controlling the flow of fluid through said conduit, and means connecting the cylinder to the vehicle, said means being angularly adjustable relative to the cylinder about the longitudinal axis of the cylinder.

WILLIAM P. DALRYMPLE.